United States Patent [19]

Fazio et al.

[11] Patent Number: 4,981,933

[45] Date of Patent: Jan. 1, 1991

[54] AZLACTONE COPOLYMERS

[75] Inventors: Robert C. Fazio, Arlington; Lloyd D. Taylor, Lexington, both of Mass.

[73] Assignee: Polaroid Corporation, Cambridge, Mass.

[21] Appl. No.: 370,809

[22] Filed: Jun. 23, 1989

[51] Int. Cl.$^5$ ............................................. C08F 26/06
[52] U.S. Cl. .................................. 526/260; 430/213; 430/941
[58] Field of Search ................. 526/260; 430/213, 941

[56] References Cited

U.S. PATENT DOCUMENTS

| | | | |
|---|---|---|---|
| 3,488,327 | 1/1970 | Kollinsky et al. | 260/78.3 |
| 3,583,950 | 6/1971 | Kollinsky et al. | 260/78 |
| 3,721,565 | 3/1973 | Fitzgerald | 96/114 |
| 4,070,348 | 1/1978 | Kraemer et al. | 260/79.3 |
| 4,288,523 | 9/1981 | Taylor | 430/215 |
| 4,304,705 | 12/1981 | Heilmann et al. | 260/30.4 N |
| 4,711,840 | 12/1987 | Nowinski et al. | 526/238.1 |
| 4,721,666 | 1/1988 | Yamanouchi | 526/260 |
| 4,737,560 | 4/1988 | Heilmann et al. | 526/304 |

FOREIGN PATENT DOCUMENTS

| | | | |
|---|---|---|---|
| 0073245 | of 0000 | European Pat. Off. | |
| 1121418 | of 0000 | United Kingdom | |
| 1202119 | 8/1970 | United Kingdom | 526/260 |

OTHER PUBLICATIONS

S. Heilmann et al., Journal of Polymer Science: Chemistry of Alkenyl Azlactones. I. Radiation-Sensitive Materials Derived from Azlactone Containing Materials, vol. 22, 1179-1186 (1984).

Y. Iwakura, et al., Journal of Polymer Science: Part A-1, vol. 6, pp. 2681-2686 (1968).

L. D. Taylor, et al., Polymer Letters, "The Synthesis of Vinyl Peptide Monomers", vol. 7, pp. 597-603 (1969).

L. D. Taylor, et al., Polymer Letters, "Synthesis and Polymerization of 2-Vinyl-4,4-Dimethyl-5-Oxazolone", vol. 9, pp. 187-190 (1971).

L. D. Taylor, et al., Makaromol. Chem. Rapid Commun., "Synthesis of Poly(4,4-dimethyl-2-vinyl-5-oxazolone) and Interesting Material for Preparing Polymeric Agents", vol. 3, pp. 779-782 (1982).

T. Baranowski, et al., "Modification of Protein Structure by Means of Azlactones", Polonaise Des Sciences, Ch. II, vol. XI, No. 3 (1963).

*Primary Examiner*—Joseph L. Schofer
*Assistant Examiner*—Alex H. Walker
*Attorney, Agent, or Firm*—Louis G. Xiarhos

[57] ABSTRACT

Azlactone copolymers having at least two different reactive groups and useful as intermediates for the production of a variety of useful polymeric materials contain repeating units according to the formula (I)

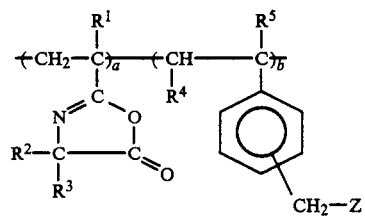

wherein $R^1$ is hydrogen or alkyl (e.g., methyl); each of $R^2$ and $R^3$ is hydrogen, alkyl (e.g., methyl, ethyl, propyl, isopropyl); aryl (e.g., phenyl, naphthyl), alkaryl (e.g., tolyl), aralkyl (e.g., benzyl), cycloalkyl (e.g., cyclohexyl, adamantyl), or $R^2$ and $R^3$ together with the carbon atom to which they are bonded constitute a carbocyclic or heterocyclic ring; each of $R^4$ and $R^5$ is hydrogen or alkyl (e.g., methyl, ethyl); Z is halogen, such as chlorine and each of a and b represents a mole proportion of each of the respective units.

8 Claims, No Drawings

AZLACTONE COPOLYMERS

BACKGROUND OF THE INVENTION

This invention relates to certain azlactone copolymers. More particularly, it relates to azlactone copolymers having at least two different reactive groups and useful as intermediates for the production of a variety of useful polymeric materials.

Polymeric azlactones (also known as oxazolones) are well known and have been described in numerous patent and other publications. The functionality of pendant azlactone groups of such polymers, particularly the reaction of such groups with nucleophilic materials and without production of by-product materials, has been reported. Thus, polymerizable azlactones and their use in the production of homopolymers and copolymers having versatility in the production of useful polymeric products has been described, for example, in U.S. Pat. No. 3,488,327(issued Jan. 6, 1970 to F. Kollinsky et al.); in U.S. Pat. No. 3,583,950. (issued June 8, 1971 to F. Kollinsky et al.); in U.S. Pat. No. 4,304,705 (issued Dec. 8, 1981 to S. M. Heilmann et al.); in U.S. Pat. No. 4,737,560 (issued Apr. 12, 1988 to S. M. Heilmann et al.); by Iwakura, et al., in Journal of Polymer Science, Vol. 6, pp. 2681-2684 (1968); by L. D. Taylor, et al., in Makromol. Chem., Rapid Commun. 3, 779-782 (1982); and by J. K. Rassmussen, et al., in Encycl. Polm. Sci. Eng., Second Edition, H. F. Mark, N. Bikales, C. G. Overberger and G. Menges, Editors, Wiley, New York, N.Y., Vol. 11, pp. 558-571 (1988).

The development of reactive polymers as derivatizable materials for the attachment of various functional agents, such as catalysts, reagents, proteins, chelating agents and photographically useful groups, has been well known and is referenced, for example, in the aforementioned U.S. Pat. No. 4,737,560. Frequently, a derivatizable polymer will be especially attractive where the polymer (or intermediate polymer) can be functionalized or derivatized from an aqueous medium. It will be appreciated that various extractive methods for selective removal of metallic materials, diagnostic methods for detecting or monitoring biological substances or fluids, and other methods relying on the use of a functional agent linked to a polymeric material, will be based upon aqueous media. Where a functional agent is covalently attached to the azlactone groups of an azlactone polymer, according to the well known azlactone ring-opening reaction involving a reactive nucleophile, the attachment of the nucleophile and the functionality of the resulting derivative will be materially influenced by the affinity of the azlactone polymer for water.

Azlactone polymers in the form of homopolymers are, in general, insoluble in water and only poorly wetted by water, effectively negating the usefulness of the azlactone functionality in aqueous media. The homopolymer of 2-vinyl-4,4-dimethyl-5-oxazolone (VDMO) is, for example, soluble in organic solvents such as chloroform, dichloromethane, dimethylformamide or tetrahydrofuran, and, if kept very dry, in ethyl acetate, benzene or acetone—as reported by L. D. Taylor, et al., in Makromol. Chem. Rapid Commun. 3, 779-782 (1982). The homopolymer is, however, insoluble in water and poorly wettable. The production of an azlactone copolymer having desired hydrophilicity will be dictated for the most part by the nature of the copolymerizable monomer. In general, a suitable comonomeric material, such as an ethylenically unsaturated copolymerizable monomer, will be one having a polymerization reactivity which permits production of the desired copolymer, i.e., one which allows for production of the copolymer and not an azlactone homopolymer. In addition, the copolymerizable monomer must provide the desired hydrophilicity or contain a reactive moiety which by subsequent reaction can provide the requisite hydrophilicity. In this connection, it is to be noted that copolymerizable monomers which tend to promote hydrophilicity oftentimes contain nucleophilic moieties, such as hydroxyl or amino groups, which may tend to interfere with desired copolymerization by undesired ring-opening reaction with pendant azlactone groups. It will be appreciated that there will considerable interest in an azlactone copolymer having at least two different reactive groups and which can be used as an intermediate for the production of a variety of useful copolymeric materials, including those especially adapted to utilization in aqueous media.

SUMMARY OF THE INVENTION

It has been found that an ethylenically unsaturated polymerizable azlactone monomer can be readily polymerized with a copolymerizable vinylbenzyl halide for production of a copolymer having the respective reaction functionalities of pendant azlactone and benzyl halide moieties and that the resulting copolymer can, by reaction of these different moieties, serve as a versatile intermediate for the production of a variety of useful polymeric materials. In a product aspect, the present invention includes a copolymer containing repeating units according to the formula

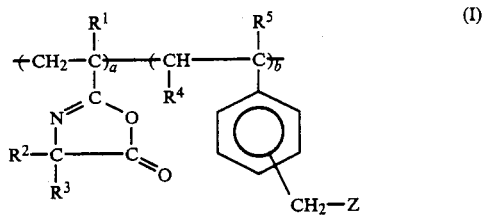

wherein $R^1$ is hydrogen or alkyl (e.g., methyl); each of $R^2$ and $R^3$ is hydrogen, alkyl (e.g., methyl, ethyl, propyl, isopropyl); aryl (e.g., phenyl, naphthyl), alkaryl (e.g., tolyl), aralkyl (e.g., benzyl), cycloalkyl (e.g., cyclohexyl, adamantyl), or $R^2$ and $R^3$ together with the carbon atom to which they are bonded constitute a carbocyclic or heterocyclic ring; each of $R^4$ and $R^5$ is hydrogen or alkyl (e.g., methyl, ethyl); Z is halogen, such as chlorine and each of a and b represents a mole proportion of each of the respective units.

According to another product aspect of the present invention, there is provided a copolymer having azlactone and quaternary ammonium functionalities, the polymer containing repeating units according to the formula (II)

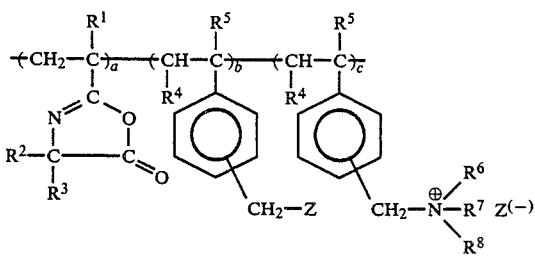

(II)

wherein each of $R^1$, $R^2$, $R^3$, $R^4$, $R^5$, and Z has the meaning previously defined; each of a, b and c represents a molar proportion of each of the respective repeating units; each of $R^6$, $R^7$ and $R^8$ is alkyl (e.g., methyl, propyl, butyl), substituted-alkyl (e.g., hydroxyethyl, hydroxypropyl), cycloalkyl (e.g., cyclohexyl), aryl (e.g., phenyl, naphthyl), aralkyl (e.g., benzyl), alkaryl (e.g., tolyl), or at least two of $R^6$, $R^7$ and $R^8$ together with the quaternary nitrogen atom to which they are bonded complete an saturated or unsaturated, substituted or unsubstituted nitrogen-containing heterocyclic ring (e.g., morpholino, piperidino or 1-pyridyl); and $Z^{(-)}$ is a counteranion (e.g., halide). These copolymers have the desired functionality and versatility of the pendant azlactone groups and, as a function of control of the nature of the $R^6$, $R^7$ and $R^8$ groups, exhibit wettability by water and coatability from aqueous media.

DETAILED DESCRIPTION OF THE INVENTION

As indicated previously, the present invention is directed toward certain azlactone-containing copolymeric intermediates represented, for example, by formulas (I) and (II). From inspection of formula (I), it will be appreciated that the copolymers thereof are produced by the copolymerization of a polymerizable azlactone-containing monomer shown by formula (Ia)

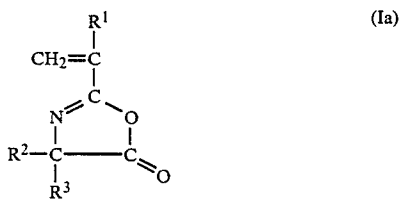

(Ia)

(wherein $R^1$, $R^2$ and $R^3$ are as previously defined) with a copolymerizable vinylbenzyl halide monomer shown by the formula (Ib)

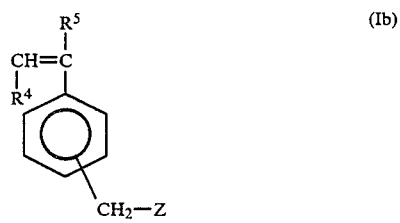

(Ib)

(wherein $R^4$, $R^5$ and Z are as previously defined).

The formula-(Ia) polymerizable azlactone monomers are termed 2-alkenyl-5-oxazolones. These are known compounds and can be prepared via known synthetic methods. Azlactones, in general, may be considered to be anhydrides of α-acylamino acids, and one suitable synthetic method for their preparation involves the removal of water from an α-acylamino acid using acetic anhydride, as is described in "Organic Reactions", Vol. 3, 198 (1949). An example of a suitable reaction scheme involves (a) the acylation of α-amino-isobutyric acid using acrylyl chloride and (b) a subsequent dehydrative ring closure, as is shown in the following reaction scheme (Reaction Scheme A):

Reaction Scheme A:

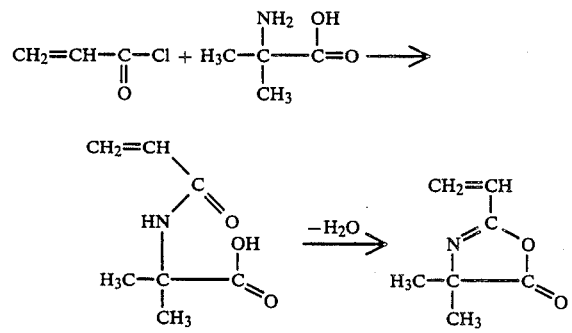

If desired, an N-acrylyl-α-amino acid can be reacted with an alkyl haloformate such as ethyl chloroformate to prepare a 2-alkenyl-5-oxazolone, as is described, for example, by L. D. Taylor, et al., in J. Polym. Sci. B, Vol. 7, 597 (1969). Benzyl haloformates can also be used. The use of anhydrides such as acetic anhydride and trifluoroacetic anhydride for the cyclodehydration of N-acrylyl-α-amino acids and formation of a 2-alkenyl-5-oxazolone is also described, for example, by J. W. Lynn in J. Org. Chem., 24,1030 (1959) and in Great Britain Pat. No. 1,121,418. The oxazolones may also be prepared by reacting the N-acrylyl-α-amino acid with a carbodiimide such as dicyclohexylcarbodiimide or N-ethyl-N'-(δ-dimethylaminopropyl) carbodiimide hydrochloride, as is disclosed by Chen, et al., in Synthesis, No. 3, 230 (1979).

Examples of ethylenically unsaturated polymerizable azlactone compounds that can be used in the production of copolymers of the invention include 2-vinyl-5-oxazolone; 2-vinyl-4,4-dimethyl-5-oxazolone; 2-vinyl-4-ethyl-4-methyl-5-oxazolone; 2-vinyl-4,4-diethyl-5-oxazolone; 2-vinyl-4-iso-butyl-4-methyl-5-oxazolone; 2-vinyl-4,4-diphenyl-5-oxazolone; 2-vinyl-4,4-ditolyl-5-oxazolone; 2-vinyl-4,4-dibenzyl-5-oxazolone; 2-vinyl-4,4-dicyclohexyl-5-oxazolone; and 2-isopropenyl-4,4-dimethyl-5-oxazolone.

It will be noted that the $R^1$ group of the formula-(Ia) azlactone compounds can be hydrogen or alkyl. Thus, the ethylenically-unsaturated moiety of the formula-(Ia) azlactone compound can be vinyl or, for example, isopropenyl. The vinyl azlactones are, however, preferred, from the standpoints of greater reactivity in polymerization reactions and a reduced tendency toward the production of polymers which exhibit a brittle character.

As indicated previously, each of $R^2$ and $R^3$ in the formula-(Ia) azlactones can be hydrogen if desired. It will be preferred, however, from the standpoints of minimizing undesirable rearrangements and achieving higher yields of purer and more stable polymer, that the $R^2$ and $R^3$ substituent groups be other than hydrogen. The desirability of nonhydrogen substituents is disclosed, for example, by L. D. Taylor, et al., in J. Polym.

Sci. 8, Vol. 9, 187, (1971). In general, good results are obtained when the $R^2$ and $R^3$ substituents are alkyl. Especially preferred are the formula-(Ia) azlactones wherein each of $R^2$ and $R^3$ is the same alkyl, such as methyl.

The formula-(Ib) copolymerizable vinylbenzyl halide monomer contributes importantly to the properties observed in the copolymeric intermediate compounds of the invention. As can be seen from inspection of the formula-(Ib) copolymerizable monomer and from the corresponding repeating units of the formula-(I) copolymer, the formula-(Ib) copolymerizable monomer is an alkenylbenzyl halide. Each of $R^4$ and $R^5$ can be hydrogen or alkyl (e.g., alkyl of from 1 to 6 carbon atoms). Preferably, each of $R^4$ and $R^5$ will be hydrogen and halogen group Z will be a chlorine atom.

A preferred formula-(Ib) copolymerizable monomer will be vinylbenzyl chloride which is commercially available (Dow Chemical Company, Midland, Mich.). Typically, the vinylbenzyl chloride will comprise a mixture of predominantly para and meta isomers, with a small content of ortho isomer. Accordingly, molecular structures illustrated herein show the essential halomethyl moiety

$-CH_2-Z$ without specific assignment to one position on the phenyl ring. The formula-(Ib) copolymerizable alkenylbenzyl halide is especially useful in the production of the formula-(I) copolymers hereof, in that, the monomer exhibits good reactivity during polymerization with production of the desired copolymer. In addition, the formula-(Ib) monomer can be copolymerized with the copolymerizable azlactone monomer without undesirable interference (reaction) with the azlactone rings which are an essential part of the resulting derivatizable copolymers, i.e., the azlactone rings are not subjected to ring-opening attack during the polymerization procedure.

The formula-(I) copolymers can be prepared by copolymerization of the formula-(Ia) and -(Ib) monomers using a variety of polymerization methods, such as solution, bulk, suspension and emulsion polymerization methods. The polymerization can be initiated chemically, e.g., by suitable free-radical or redox initiation or by other means, such as heat or incident radiation. As examples of chemical initiators, mention may be made of 2,2'-azobisisobutyronitrile, potassium persulfate, sodium bisulfite, benzoyl peroxide, diacetyl peroxide, hydrogen peroxide and diazoaminobenzene. It will be appreciated that the chosen means of initiation should be substantially incapable of degrading or otherwise adversely reacting with either reactants or products of the reaction. The amount of catalyst used and the reaction temperature may be varied to suit particular needs. Generally, the polymerization should proceed satisfactorily by carrying out the reaction at a temperature between 25° C. and 100° C. and using less the 5% by weight of initiator, based on the starting weight of the polymerizable monomer or monomers.

The proportions of formula-(Ia) and -(Ib) comonomers can vary widely, for example, in a molar range of from 1:99 to 99:1. In general, the azlactone repeating units will be of primary importance for their versatility as derivatizable units and will be present in the copolymers such that the ratio of "a" and "b" repeating units is in the range of from 1:9 to 9:1, and especially, from 1:4 to 4:1. Particular ratios can vary depending upon the desired derivatizations to be performed on the respective and different reactive sites and on the applications intended for the derivatized copolymers.

Polymerization techniques that can be modified by inclusion of the copolymerizable formula-(Ib) monomer are those described, for example by L. D. Taylor, et al., J. Polym. Sci. B, Vol. 9, 187 (1971); by Iwakura, et al., J. Polym. Sci., A-1, Vol. 6, 2681 (1968); in U.S. Pat. Nos. 3,488,327; 3,583,950; and in Great Britain Pat. No. 1,121,418.

Other ethylenically unsaturated copolymerizable monomers can be included during the copolymerization of the formula-(Ia) and -(Ib) monomers, for purposes of imparting predetermined physical properties to the copolymer or to the derivatized products thereof. Vinyl sulfonic acids and salts, acrylic and methacrylic acids and esters and dialkylaminoethyl acrylates and methacrylates can be used for control of hydrophilic/hydrophobic balance. The tendency of any additional copolymerizable monomer(s) to react with the formula-(Ia) and/or -(Ib) monomers should be considered in selecting suitable copolymerizable monomers.

The pendant benzyl halide moieties of the formula-(I) copolymers provide considerable synthetic versatility to the copolymers. Thus, the benzyl halide groups permit the copolymers to be derivatized at the halomethyl reactive sites for the purpose of introducing certain predetermined and useful activity. For example, photographically useful or therapeutically active agents can be attached to the copolymer by reaction with halomethyl groups. If desired, the halomethyl reactive sites can be reacted with agents which have the principal effect of modifying, controlling or adjusting the physical properties of the azlactone-containing copolymer. In this connection, trialkylamines can be reacted with the halomethyl reactive sites for conversion to quaternary ammonium groups which increase the hydrophilicity of the copolymer and improve wettability in aqueous systems.

The reactivity of halomethyl groups toward nucleophilic agents is well known and provides the means by which useful and active moieties can be introduced synthetically into a polymeric material. It will be appreciated that nucleophilic agents which show reactivity toward halomethyl groups, in general, will also be reactive toward azlactone rings. Such agents can be used to simultaneously derivatize the pendant halomethyl and azlactone moieties of the copolymers of the invention.

If desired, halomethyl groups of the formula-(I) copolymer can be reacted with an agent which shows either no reactivity or substantially no reactivity toward the pendant azlactone moieties. In this manner, predetermined functionality can be introduced at halomethyl sites while retaining the reactivity of the azlactone groups and, thus, preserving a variety of synthetic possibilities involving the azlactone groups. According to one derivatization scheme, a formula-(I) copolymer of the invention can be reacted with thiourea for conversion of reactive halomethyl groups to isothiouronium salt groups. Unreacted azlactone groups can then be reacted with a nucleophilic agent for incorporation, for example, of a photographically useful group, such as a diffusion control moiety of the type described in U.S. Pat. No. 4,288,523 (issued Sept. 8, 1981 to L. D. Taylor) or a diamide group of the type described in U.S. Pat. No. 3,721,565 (issued Mar. 20, 1973), useful to provide silver halide emulsion binding properties. Upon contact with aqueous alkali (e.g., during aqueous alkaline photographic processing), isothiouronium salt groups can be hydrolyzed to thiol groups to provide silver-scavenging functionality in the photographic process.

A preferred use for the formula-(I) copolymers of the invention involves the reaction of pendant halomethyl groups for control of the hydrophilic/hydrophobic balance of the copolymer. Inasmuch as the homopolymers of the formula-(Ia) 2-alkenyl-5-oxazolones are water-insoluble and only poorly wetted by water, a method whereby the formula-(I) coploymers can be converted to wettable azlactone-carrying polymeric materials will be of interest. This can be accomplished by reaction of a formula-(I) copolymer with a tertiary amine of the formula $$\begin{array}{c} R^6 \\ | \\ N-R^7 \\ | \\ R^8 \end{array}$$

wherein each of $R^6$, $R^7$ and $R^8$ is as previously defined. Preferably, each of $R^6$, $R^7$ and $R^8$ will be alkyl having, for example, from 1 to 20 carbon atoms. A preferred tertiary amine for this reaction is trimethylamine and the reaction is illustrated by the following scheme (Reaction Scheme B):

Reaction Scheme B

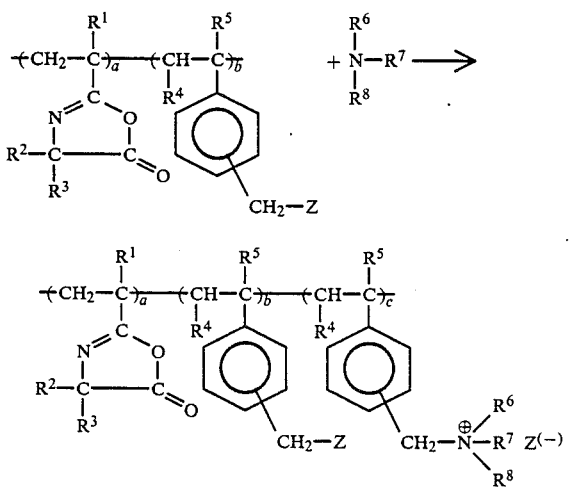

wherein $R^1$, $R^2$, $R^3$, $R^4$, $R^5$, $R^6$, $R^7$, $R^8$, Z, $Z^{(-)}$, a, b and c have the meanings previously defined.

The derivatization of Reaction Scheme B can be conducted in a suitably inert organic solvent such as acetone, tetrahydrofuran, benzene, toluene, dioxane, ethyl acetate, methylethylketone, chloroform or dichloromethane. Preferably, the solvent will be anhydrous to minimize reaction with pendant azlactone groups.

It is to be noted that in the aforedescribed Reaction Scheme B, the tertiary amine reactant is non-interfering, i.e., it does not react with the pendant azlactone. As a consequence, the azlactone moieties remain intact for a subsequent and predetermined derivatization based upon the known reactivity of azlactone moieties. The tertiary amine derivatization of the formula-(I) copolymer converts the copolymer to one which can be wetted by water, thus, making the polymer considerably more useful for subsequent derivatization of the azlactone moieties. In addition, the tertiary amine reaction provides a polymer useful as a dye mordant for photographic systems. The formula-(II) copolymer can be provided on a support and used as an image-receiving element in, for example, a photographic film unit of the diffusion transfer type.

The hydrophilic/hydrophobic properties observed in the formula-(II) copolymer can be controlled in part by the amount of tertiary amine used in the reaction and by the nature of the $R^6$, $R^7$ and $R^8$ groups of the tertiary amine reactant. As can be seen from inspection of the nature of the repeating units in the formula-(II) copolymers, unreacted (non-derivatized) vinylbenzyl halide repeating units can be present in the copolymer. The proportion of such repeating units will vary with the nature of the particular formula-(I) copolymer, the amount of tertiary amine used for the derivatization and the reaction conditions employed. The mole proportion of "b" repeating units can vary, for example, from zero to about 95 mole percent of the formula-(II) copolymer. The amount of tertiary amine reactant employed can be varied to suit particular requirements and the nature of the subsequent derivatization to be performed by reaction of the azlactone moieties.

In general, it will be desired to employ an amount of tertiary amine reactant sufficient to convert most or all of the vinylbenzyl halide "b" repeating units to the corresponding ammonium-containing "c" repeating units. While tertiary amines are not, in general, reactive with azlactones per se, they do serve to catalyze nucleophilic additions to azlactones. Thus, the use of an excess of tertiary amine reactant can be employed to facilitate subsequent azlactone derivatizations without requirement of an isolation step for recovery of the formula-(II) intermediate copolymer. Accordingly, amine derivatization of the formula-(I) halomethyl groups and tertiary amine-catalyzed nucleophilic additions to the formula-(II) azlactone groups can be accomplished by one-pot methods. In some instances, it will be desirable if "b" in the formula-(II) copolymers is zero. Typically, however, the formula-(II) copolymer will contain a proportion (e.g., in the range from about 0.1 mole percent to about 5 mole percent of the copolymer) of the non-derivatized vinylbenzyl halide "b" repeating units.

As indicated previously, the properties of the formula-(II) copolymers can be controlled in part by the nature of the $R^6$, $R^7$ and $R^8$ groups of the tertiary amine used in the derivatization of reaction Scheme B. Good results can be obtained, for example, using trimethylamine or triethylamine. Hydrophobicity can be introduced using, for example, n-dodecyldimethylamine (in which case, in formula (II), $R^6$ will be n-dodecyl and $R^7$ and $R^8$ will be methyl) or n-dodecyldiethylamine ($R^6$ is n-dodecyl and $R^7$ and $R^8$ are ethyl). Other variations in the complement of $R^6$, $R^7$ $R^8$ can be used to control desired properties. For example, $R^6$ can be adamantyl and $R^7$ and $R^8$ can be methyl.

The properties of the formula-(I) and -(II) copolymers can be substantially modified by crosslinking reactions involving pendant azlactone and/or halomethyl groups. Bifunctional crosslinking agents can be used for this purpose. For example, an aliphatic diamine can be used to effect ring opening of pendant azlactone groups and simultaneous joinder of macromolecules, as is described in the aforecited U.S. Pat. No. 3,583,950. If desired, the reaction of pendant halomethyl groups with a bifunctional crosslinking agent (such as an aliphatic diamine having α,Ω-tertiary amine groups) can be used to provide crosslinking and insolubilization. In many instances, it will be preferred to effect crosslinking by reaction of either the azlactone groups or the halomethyl groups to the exclusion of the other, so as to preserve the remaining of such reactive groups for a subsequent and predetermined derivatization. If desired, however, a bifunctional crosslinking agent which can react with both azlactone and halomethyl groups can be employed. Suitable crosslinking agents for this purpose include diamines having both primary and tertiary amine terminal groups and aromatic amines having both primary and tertiary amine substituents. Suitable crosslinking reactions (partial or complete) can be varied to suit the particular nature and properties of a copolymer material, and especially, the intended application for the resulting polymer.

The formula-(I) and -(II) copolymers of the invention are of particular interest for their azlactone (5-oxazolone) functionality. The reactivity of the 5-oxazolone ring with nucleophilic groups such as hydroxyl, amino and thiol groups is well known and is described, for example, in U.S. Pat. Nos. 3,488,327; 3,583,950; 4,070,348; 4,288,523; 4,737,560; in Great Britain Pat. No. 1,121,418; and by Iwakura, et al., in J. Polym. Sci., A-1, 6(9), 2681 (1968). A principal and recognized advantage of azlactone compounds is that nucleophilic attack occurs without production of by-products.

The copolymers of the invention can be used as intermediates for the ring-opening attachment of a variety of functional agents having an active hydrogen atom and having the formula

H—Y—G wherein Y is —O—, —NH—, —NR$^9$— or —S— (wherein R$^9$ is alkyl or aryl), and G is the residue of a nucleophilic functional agent having an active hydrogen group. Functional agent

H—Y—G can be a dye, a photographically useful compound (e.g., a development accelerator or restrainer, or a UV stabilizer), a catalyst, or a protein (e.g., an enzyme, enzyme substrate, inhibitor, hormone, antibiotic, antibody or antigen).

The reaction of a nucleophilic substance of the aforementioned type with a formula-(II) copolymer of the invention—to provide a functionalized polymeric material of formula (III)—is represented by the following scheme (Reaction Scheme C), wherein R$^1$, R$^2$, R$^3$, R$^4$, R$^5$, R$^6$, R$^7$, R$^8$, Z, Z$^{(-)}$, a, b and c have the meanings previously defined:

Reaction Scheme C:

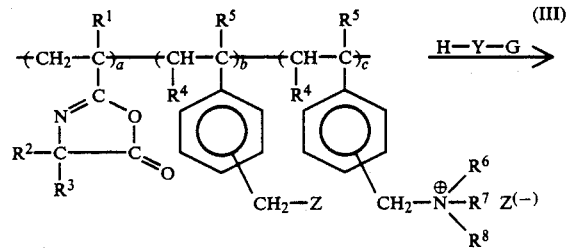

-continued

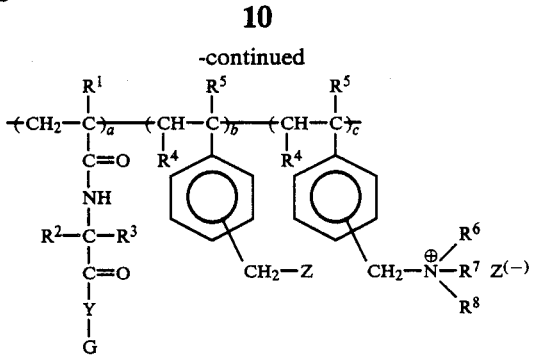

Functionalized polymeric materials of the type represented by formula (III) can be used for the useful function provided by the residue

—Y—G appended to the polymeric material. Residue —YG can, for example, be the residue or fragment of a dye material or other photographically useful material. Especially useful will be a photographically useful moiety that can be released in an imagewise manner from the formula-(III) polymer, such as, by a cleavage mechanism effected by a cleavage-initiating agent (e.g., silver ion, silver complex, oxidizing or reducing agent). Examples of such agents and their attachment to azlactone polymers and release therefrom are described in European Pat. No. 0 073 245, published Jan. 9, 1985.

The azlactone-containing formula-(II) copolymers of the invention can be used in various biological and immunoassay methods used for the detection and measurement of proteins, metabolites, hormones, drugs, vitamins and other substances of interest (analytes) in biological and nonbiological fluids. As is disclosed, for example, in U.S. Pat. No. 4,711,840 (issued Dec. 8, 1987 to R. C. Nowinski, et al.), immunoassays generally incorporate antibodies and antigens as reactants, at least one of which is labeled with a signal-producing compound (e.g., radioisotope or fluorophore). Following mixture with the sample and incubation, specific antibody/antigen reactions occur (specific binding). The reaction mixture is subsequently interrogated to detect free and specifically bond labeled reactant, enabling a measurement of the analyte in the sample. The azlactone-containing polymers of the invention can be reacted with proteins and other agents with resulting specific binding that can be detected in accordance with the aforedescribed and generally known immunoassay methods.

The known reactivity of oxazolones with amino and hydroxyl groups affords a variety of applications for the copolymers of the present invention. The reaction of a gelatin solution and an azlactone is reported by T. Baranowski, et al., in Polonaise Des Sciences, Ch. II -Vol. XI, No. 3, (1963). Similarly, it is disclosed in U.S. Pat. No. 4,070,348 (issued Jan. 24, 1978 to D. Kraemer, et al.) that 2-isopropenyl-4,4-dimethyl-oxazolone-5 reacts with the terminal amino group of a protein. Biologically active substances, such as proteins, typically have a terminal primary amino group. These and other biologically active substances can be reacted in immunoassay and other water-based systems, using a formula-(II) copolymer of the invention, according to the following reaction scheme (Reaction Scheme D):

Reaction Scheme D:

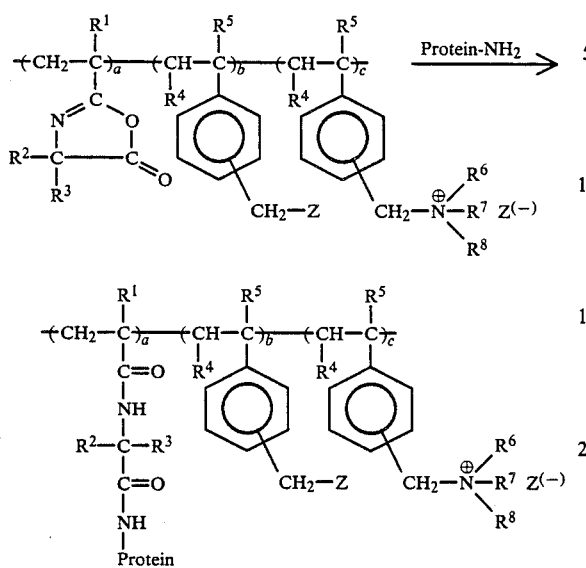

Upon reaction with enzymes, enzyme substrates, inhibitors, hormones, antibiotics, antibodies, antigens, or peptides, the azlactone groups of the formula-(II) copolymers form covalent bonds to oxygen or nitrogen atoms, in aqueous solution at temperatures within the range of about 0° C. to 40° C. If the biologically active substances have a protein character, they have a terminal primary amino or hydroxyl group, and depending upon the particular substance, may have additional amino or hydroxyl reactive sites. The azlactone moieties are sensitive to hydrolysis and, if they do not react with the active substances offered, can be converted in the presence of water, into hydrophilic carboxyl or hydroxyl groups.

The following examples are illustrative of the present invention and it will be understood that the invention is not limited thereto. All parts and percentages are by weight, except as otherwise indicated. In all instances, the vinylbenzyl trialkyl ammonium chloride monomer utilized in the polymerizations was a mixture predominantly of para and meta isomers, additionally containing a small content of ortho isomer. Accordingly, the molecular structures provided in the examples to represent the vinylbenzyl trialkyl ammonium repeating units reflect the utilization of such a mixture by showing the quaternary ammonium moiety without positional specificity.

EXAMPLE 1

The Example illustrates the preparation of poly(2-vinyl-4,4-dimethyl-5-oxazolone-co-vinylbenzyl chloride).

Vinylbenzyl chloride (VBC, 45.65 g, 0.3 mole) and 2-vinyl-4,4-dimethyl-5-oxazolone (VDMO 20.9 g, 0.15 mole) were added successively to 150-ml of dry methyl ethyl ketone in a 500-ml, three-necked flask. While stirring, the mixture was purged for ten minutes with dry nitrogen. As an initiator, 100 mg of 2,2'-azobisisobutyronitrile were added. The reaction temperature increased to 50° C. and was maintained for 24 hours while slowly purging with a stream of nitrogen. The mixture was poured slowly into 500 ml of hexanes, precipitating the polymer. After removal of the solvent, the precipitate was dissolved in acetone and precipitated again by slow addition to hexanes. The product, dried under high vacuum for 24 hours, was obtained in an amount of 36 g (54%).

The product was the above-named copolymer having the following formula, where proportions are molar proportions:

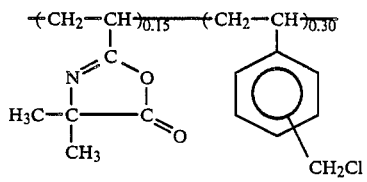

The above structure and the azlactone carbonyl absorption band at 1820 cm$^{-1}$ were confirmed by infrared (KBr) analysis.

EXAMPLE 2

This Example illustrates the preparation of poly(2-vinyl-4,4-dimethyl-5-oxazolone-co-vinylbenzyltrimethylammonium chloride).

Into 400 ml of dry acetone were dissolved 28 g of poly (VDMO-co-VBC), prepared in the manner described in Example 1. The solution temperature was lowered to 8° C., at which time, 20 ml of anhydrous trimethylamine were added. The reaction temperature was maintained at 8° C. for 16 minutes, at which point, a white precipitate began to form. Approximately 30 minutes later, solvent and unreacted trimethylamine were removed, yielding a white cake. The white cake was pulverized, washed with copious amounts of acetone, and dried under high vacuum for 24 hours, yielding 29 g of the above-named copolymer having the following structure:

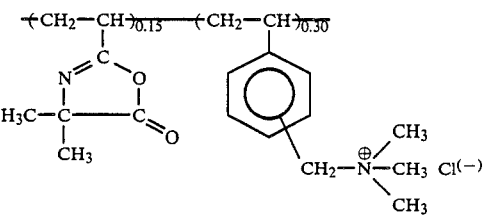

The azlactone carbonyl absorption band (1820 cm$^{-1}$) was confirmed by IR (KBr) analysis. Successful quaternization was confirmed by inherent aqueous solubility of the copolymer and by proton NMR and $^{13}$C-NMR analyses.

EXAMPLE 3

This Example illustrates the hydrolysis of a 0.5/1 (mole ratio) copolymer of VDMO and vinylbenzyltrimethylammonium chloride.

A sample of 0.5/1 (mole ratio) poly (VDMO-co-vinylbenzyltrimethylammonium chloride) was added to distilled water (pH ca. 7.0) at room temperature. Complete hydrolysis, monitored by the disappearance of the carbonyl stretching frequency at 1820 cm$^{-1}$, was observed in about two hours. In 24 hours, the pH had dropped to 1.5. Following an initial hydrolysis on dissolution, the hydrolysis rate was curtailed for about 15 minutes. The hydrolyzed copolymer had the following structure:

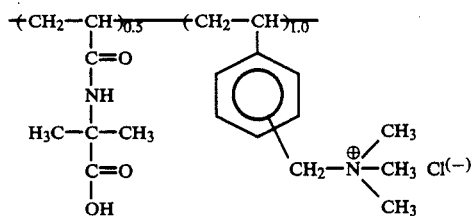

EXAMPLE 4

This Example illustrates the preparation of the 30/70 (mole ratio) copolymer of VDMO and VBC.

A 500-ml, three-necked flask, equipped with a mechanical stirrer, thermometer and nitrogen inlet, was charged with 50 ml of dry acetone, vinylbenzylchloride (42.6 g, 0.28 mole) and 2-vinyl-4,4-dimethylazlactone (16.69 g, 0.12 mole). The solution was purged with dry nitrogen through a fritted glass aeration tube for 10 minutes. As an initiator, 2,2'-azobisisobutyronitrile (AIBN, 100 mg) was added under stirring. The reaction temperature was raised to 50° C. and the reaction contents were stirred for 16 hours while a very slow stream of nitrogen was passed through the vessel. A second 100-mg aliquot of AIBN was added and the reaction mixture was stirred an additional 20 hours. The reaction volume, reduced by approximately one-third, was poured into 500 ml of dry hexane, forming a white precipitate. The supernatant was discarded and the precipitate was redissolved in a minimal amount of dry acetone (25-30 ml) and reprecipitated in 200 ml hexane. The supernatant was again discarded and the precipitate dried under high vacuum at 50° C. for 20 hours. The yield was 36.5 g, (54%). Fourier Transform Infrared (FTIR) analysis, cast on AgCl plates, confirmed a strong azlactone carbonyl band at 1820 cm$^{-1}$. The monomeric ratio incorporated into the polymer was confirmed by high field proton and carbon-13 NMR and found to be consistent with the title compound.

EXAMPLE 5

This Example illustrates the quaternization of the copolymer of Example 4 to prepare 30/70 (mole ratio) poly(2-vinyl-4,4-dimethyl-5-oxazolone-co-vinylbenzyltrimethylammonium chloride).

A one-liter, side-arm Erlenmyer flask (scrupulously dried and equipped with a magnetic stir-bar and nitrogen inlet) was charged with 400 ml of dry acetone and 28 g poly(2-vinyl-4,4-dimethyl-5-oxazolone-co-vinylbenzyl chloride (0.3/0.7). After complete dissolution of the polymer, the reaction temperature was reduced to 5° C. with the aid of an ice bath. To the rapidly stirred solution, 13 g of anhydrous trimethylamine were added. In approximately 15 minutes, a white precipitate began to form. The reaction temperature was allowed to rise gradually to room temperature, excess volatile trimethylamine being trapped by aqueous hydrochloric acid. After a total reaction time of 3.0 hours, the reaction liquid was decanted. The resulting white precipitate was broken up, washed with dry acetone and dried for 24 hours at 50° C. under high vacuum, to yield 29 g of product. Care was taken to avoid any contact with moisture. FTIR analysis (KBr pellet) confirmed the strong presence of the azlactone carbonyl at 1820 cm$^{-1}$ and a minor presence of the carboxylate carbonyl resulting from the ring-opened acid form of the azlactone. High field Proton and Carbon-13 NMR (DMSO-d$_6$) analyses confirmed the presence of the vinylbenzyltrimethyl ammonium chloride repeating units of the above-named copolymer.

EXAMPLE 6

This Example illustrates the hydrolysis of pendant azlactone groups of the copolymer of Example 5.

Into a 25-ml round-bottom flask, equipped with a magnetic stirring bar, were added 250 mg of the copolymer of Example 5 and 20 ml of distilled water at pH 6.5. The rate of ring opening of the azlactone functionality was studied by FTIR, with complete hydrolysis occurring in approximately five hours. The IR spectrum of the exhaustively hydrolyzed material displayed a complete loss of the ring carbonyl at 1820 cm$^{-1}$ and the appearance of the carboxylic acid carbonyl at 1730 cm$^{-1}$.

EXAMPLE 7

This Example illustrates the preparation of poly(-methyl 2-acrylamido-2-methyl-propionate-co-vinylbenzyltrimethylammonium chloride).

A one-liter, dry Erlenmeyer flask, equipped with a magnetic stirrer bar and nitrogen inlet, was charged with 68 g of the copolymer of Example 5 and 500 ml of dry methanol. The solution was stirred under nitrogen at room temperature for 24 hours. A 100-ml aliquot of this solution was dried and used for characterization, yield 72 g. Quantitative conversion to the methyl ester was determined by FTIR (loss of the characteristic azlactone carbonyl at 1820 cm$^{-1}$) and high field NMR (D$_2$O, methyl of the methyl ester was assigned to d 3.5).

The product was the above-named copolymer having the following structure, where proportions are mole proportions:

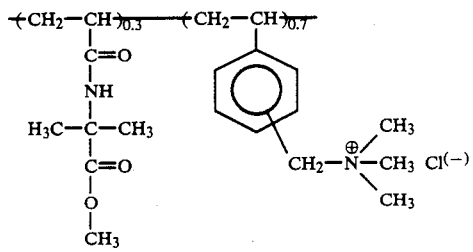

EXAMPLE 8

Using the procedure described in Example 7, and using butanol in place of methanol, the corresponding butyl ester product was prepared. Rate of reaction, followed by FTIR, was much slower for butanol than methanol. Complete conversion to the butyl ester required 48 hours at 50° C.

EXAMPLE 9

This Example illustrates the ring-opening attachment of histamine to azlactone groups of the copolymer of Example 5.

A solution containing histamine (111.0 mg, 1.0 mmol) and 10 ml distilled water was added to a 50-ml, round-bottom flask. To the rapidly stirred solution, the copolymer of Example 5 (0.5 g, 0.9 mmol in azlactone functionality) was added and allowed to mix for eight hours. The reaction was quenched with 20 ml of 1.0N acetic acid and dialyzed in water at 30° C. for 24 hours.

GPC analysis indicated less than 0.004% free histamine. FTIR analysis displayed a minimal presence of carboxylic acid carbonyl at 1730 cm$^{-1}$, as compared with the authentically derived hydrolysis product of Example 6. The two amide carbonyls were present at and 1650 cm$^{-1}$. Proton NMR (D$_2$O) also supported the presence of the attached histamine group.

The resulting derivatized polymer was a copolymer having the following structure where proportions are mole proportions:

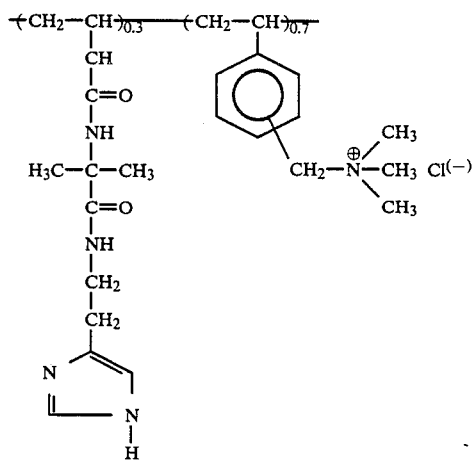

Using the procedure described in Example 9, ring-opening additions of L-alanine and 3-aminopropionitrile fumarate to the copolymer of Example 5 were performed.

EXAMPLE 10

This Example illustrates the covalent bonding of an antibody to a layer of 1/2 (mole ratio) poly(2-vinyl-4,4-dimethyl-5-oxazolone-co-vinylbenzyltrimethylammonium chloride).

A commercially available polyester film was coated (to a coverage of approximately 200 mg/m$^2$) with a solution of 1:2 mole ratio poly(2-vinyl-4,4-dimethyl-5-oxazolone-co-vinylbenzyl chloride) in methyl ethyl ketone. A section (3×3 cm) of the film was incubated (overnight at room temperature and with stirring of the incubation vessel at ten rpm) in a ten-ml solution of anti digoxin monoclonal antibody (10 μl/ml) in potassium phosphate buffer at pH 7.5. The film section was then rinsed for two minutes in a solution (pH 7.4) containing tris(hydroxymethyl) aminomethane, at a 50-mM concentration; potassium citrate, at a 50-mM concentration; and Tween nonionic ethoxylate surfactant, at a concentration of 0.01% by weight. The film section was then rinsed for two minutes in a solution having a pH of 7.4 and containing tris(hydroxymethyl) aminomethane and potassium citrate, each at a 50-mM concentration and 0.1% by weight bovine serum albumin. After air drying, ten punchouts (5×5 mm) were taken from the film section. Each punchout was placed into a 2.5-ml polypropylene test tube, into which was added a 1/500 liter solution (0.2 ml) of I$^{125}$-labeled digoxin. Each sample was incubated for two hours at room temperature and at 170 rpm.

Unbound tracer was removed by washing in triplicate with a standard ELISA wash buffer. This same procedure was followed for a sample of untreated polyester base in order to provide a control. The average total radioactivity exhibited for the control was found to be 2100 counts per minute while the copolymer-treated sample had an average total counts of 24,000 counts per minute.

What is claimed is:

1. A copolymer containing repeating units according to the formula (I)

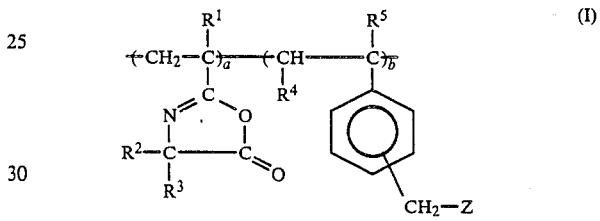

wherein R$^1$ is hydrogen or alkyl; each of R$^2$ and R$^3$ is hydrogen, alkyl, aryl, alkaryl, aralkyl, cycloalkyl, or R$^2$ and R$^3$ together with the carbon atom to which they are bonded constitute a carbocyclic or heterocyclic ring; each of R$^4$ and R$^5$ is hydrogen or alkyl; Z is halogen, and each of a and b represents a mole proportion of each of the respective repeating units.

2. The copolymer of claim 1 wherein R$^1$ is hydrogen.

3. The copolymer of claim 2 wherein each of R$^2$ and R$^3$ is alkyl.

4. The copolymer of claim 3 wherein each of R$^2$ and R$^3$ is methyl.

5. The copolymer of claim 3 wherein each of R$^4$ and R$^5$ is hydrogen.

6. The copolymer of claim 5 wherein Z is a chlorine atom.

7. The copolymer of claim wherein R$^1$ is hydrogen and each of R$^2$ and R$^3$ is methyl.

8. The copolymer of claim 7 wherein the molar ratio of a to b is from 1:4 to 4:1.

* * * * *